(12) United States Patent
Baron

(10) Patent No.: US 10,611,420 B2
(45) Date of Patent: Apr. 7, 2020

(54) SINGLE-WHEEL DROP-FLOOR TRAILER

(71) Applicant: Ben Baron, Canyon Country, CA (US)

(72) Inventor: Ben Baron, Canyon Country, CA (US)

( * ) Notice: Subject to any disclaimer, the term of this patent is extended or adjusted under 35 U.S.C. 154(b) by 162 days.

(21) Appl. No.: 15/956,697

(22) Filed: Apr. 18, 2018

(65) Prior Publication Data

US 2019/0322327 A1    Oct. 24, 2019

(51) Int. Cl.
| | |
|---|---|
| *B62D 63/06* | (2006.01) |
| *B62D 21/04* | (2006.01) |
| *B62D 63/08* | (2006.01) |
| *B60P 3/07* | (2006.01) |
| *B60D 1/167* | (2006.01) |
| *B60S 9/04* | (2006.01) |

(52) U.S. Cl.
CPC ........... *B62D 63/067* (2013.01); *B60D 1/167* (2013.01); *B60P 3/07* (2013.01); *B60S 9/04* (2013.01); *B62D 21/04* (2013.01); *B62D 63/08* (2013.01)

(58) Field of Classification Search
CPC .............................. B62D 21/04; B62D 63/067
See application file for complete search history.

(56) References Cited

U.S. PATENT DOCUMENTS

| 5,368,325 | A | | 11/1994 | Hazen | |
|---|---|---|---|---|---|
| 5,984,342 | A | * | 11/1999 | Ysker | B62K 27/006 |
| | | | | | 280/475 |
| 6,042,138 | A | | 3/2000 | Shreck | |
| D523,779 | S | | 6/2006 | Matila | |
| 7,128,330 | B2 | * | 10/2006 | Krauss | B60D 1/065 |
| | | | | | 280/456.1 |
| 7,387,308 | B2 | | 6/2008 | Williamson | |
| 8,622,429 | B2 | | 1/2014 | Ardagna | |
| 9,016,709 | B1 | * | 4/2015 | McMunn | B62D 13/025 |
| | | | | | 280/444 |
| 10,053,170 | B2 | * | 8/2018 | Boggess | B60P 3/07 |
| 2006/0175799 | A1 | | 8/2006 | Heynssens | |

* cited by examiner

*Primary Examiner* — Kevin Hurley

(57) ABSTRACT

Provided is a one-wheel drop-floor trailer for towing motorcycles. The trailer is characterized by a provision of a two-pivot link having one pivot as a part of a universal joint of a trailer hitch and another pivot as an axis for rotational connection to a main tow bar frame. The two-pivot link allows the plane-parallel movements of the trailer platform in a vertical direction between the working, i.e., transport position, and the floor or ground level for loading/unloading the bicycle.

20 Claims, 5 Drawing Sheets

SINGLE-WHEEL DROP-FLOOR TRAILER

FIELD OF THE INVENTION

The present invention relates to trailers towable by vehicles and, more particularly, to single-wheel trailers. More specifically, the invention concerns single-wheel trailers of a drop-floor type for loading and transporting relatively light loads. The trailer of the invention is most suitable for loading and transporting motorcycles, bicycles, or the like.

DESCRIPTION OF THE PRIOR ART

In a majority of cases, vehicle trailers are provided with at least two laterally spaced wheels, which define three support points for the trailer, i.e., the hitch at the front and two wheel at the back. The at-least-two-wheel trailers are needed for towing light to medium capacity loads.

If a trailer does not require a wide lateral space between the wheels, e.g., for transporting a light and narrow load such as a motorcycle, which occupies a relatively narrow space on the trailer's floor, a single wheel would provide sufficient support for such a trailer. Advantages of single-wheel trailers are their compactness for storage and savings on expenses of tires, bearings, etc. associated with the use of only one wheel. In addition, a single-wheel trailer will provide increased fuel efficiency due to less rolling resistance.

Single-wheel trailers are known in the art and are described in technical literature and patents, some of which are given below.

For example, U.S. Pat. No. 7,387,308 issued to J. Williamson on Jun. 17, 2008 discloses a single wheel trailer and a stabilizing hitch assembly that includes a hitch, which precludes lateral tilt or roll of a trailer about the longitudinal axis of the towing vehicle and trailer, the trailer having only a single wheel for support. The hitch includes a pair of horizontal plates, which bear against one another, with a vertical pivot pin securing the two plates together to allow the trailer to turn laterally relative to the towing vehicle. A separate horizontal pivot axis accommodates pitch of the trailer relative to the towing vehicle while negotiating bumps and dips.

U.S. Pat. No. 5,368,325 issued to D. Hazen on Nov. 29, 1994 discloses a trailer for towing by an automotive type vehicle, wherein the trailer frame is a single longitudinal beam. A plurality of adjustable transverse cradle support members are mounted along the beam. A single castered wheel is mounted near the back end of the beam. A hitch for attachment to a towing vehicle at the front end of the beam maintains the beam aligned with a longitudinal axis of the towing vehicle. Various types of loads may be accommodated by attaching appropriate type cradles to the cradle support members, and the spacing of support members may be adjusted to accept the load.

U.S. Design Pat. No. 523,779 S1 issued to G. Mattila on Jun. 27, 2006 Illustrates a single-wheel motorcycle trailer collapsible for storage. The trailer frame has collapsible sidewalls for convenience of storage.

U.S. Pat. No. 8,622,429 issued to N. Ardagna on Jan. 7, 2014 discloses a high-performance, light-duty, utility trailer that is pulled by a tow vehicle utilizing a two point coupling to the tow vehicle and a swiveling axle assembly. The design includes a tilting hitch assembly attached to the trailer frame and swiveling casters attached to the rear corners of the trailer frame, creating a three-point "landing gear" for installation onto the tow vehicle and providing good un-hitched mobility allowing the trailer owner to easily move the trailer out-of-the-way when stored between each use. A wheel swiveling assembly that can be configured to provide steering geometry capable of being customized to accommodate driving habits and road conditions. The device has a two-point hitch assembly that allows the removal of adaptors when not in use for both functional and aesthetic purposes.

U.S. Pat. No. 6,042,138 issued to R. Shreck on Mar. 28, 2000 discloses a motorcycle trailer apparatus that includes an elongated frame having first and second end portions, the first end portion carrying a detachable hitch for attaching the frame to the rear of a motorcycle. An arm assembly is pivotally attached to the frame at the second end portion. The arm assembly carries a single wheel. A shock absorber extends between the frame and the arm assembly at an inclined portion of the arm assembly.

US Patent Application Publication No. 2006/0175799 published on Aug. 10, 2006 (Inventor: R. Heynssens disclosed a single-wheel drop-floor trailer that has a load carrying bed to which a carriage frame and a coupling are slideably attached to opposite sides. Actuators are provided to move the bed with respect to both the carriage frame and the coupling. At least one wheel is attached to the carriage frame to support the utility trailer on the ground. When the coupling is connected to a hitch on a motor vehicle, operating the actuators lowers the bed against the ground to facilitate loading and unloading and raises the bed to enable the trailer to travel.

SUMMARY OF THE INVENTION

The present invention relates to trailers towable by vehicles and, more particularly, to single-wheel trailers of a drop-floor type for loading and transporting relatively light loads such as motorcycles, bicycles, or the like. The trailer of the invention is characterized by a provision of a two-pivot link having one pivot as a part of a universal joint of the trailer hitch and another pivot for rotational connection to a main tow bar frame. The two-pivot links allow the plane-parallel movement of the trailer platform in a vertical direction between the working, i.e., transport position, and the floor or ground level for loading/unloading of the bicycle. The trailer may be additionally provided with small caster wheels at the rear end of the trailer platform for convenience of pulling the trailer over the garage and with an L-shaped ground support for supporting the wheeled-trailer in a raised position for convenience of cleaning and repair.

DETAILED DESCRIPTION OF THE INVENTION

The present invention relates to trailers towable by vehicles and, more particularly, to single-wheel trailers. More specifically, the invention concerns single-wheel trailers of a drop-floor type for loading/unloading and transporting relatively light loads. The trailer of the invention is most suitable for transporting motorcycles, bicycles, or the like.

In general, the single-wheel drop-floor type trailer of the invention (hereinafter referred to merely as a "trailer of the invention") is similar to a conventional trailer of this type but is characterized by a provision of an essential feature, i.e., a two-pivot link between the towing vehicle and the main tow bar frame of the trailer. In addition to saving the trailer storage space, a provision of this feature simplifies the structure and usage of the trailer.

Figure 1:
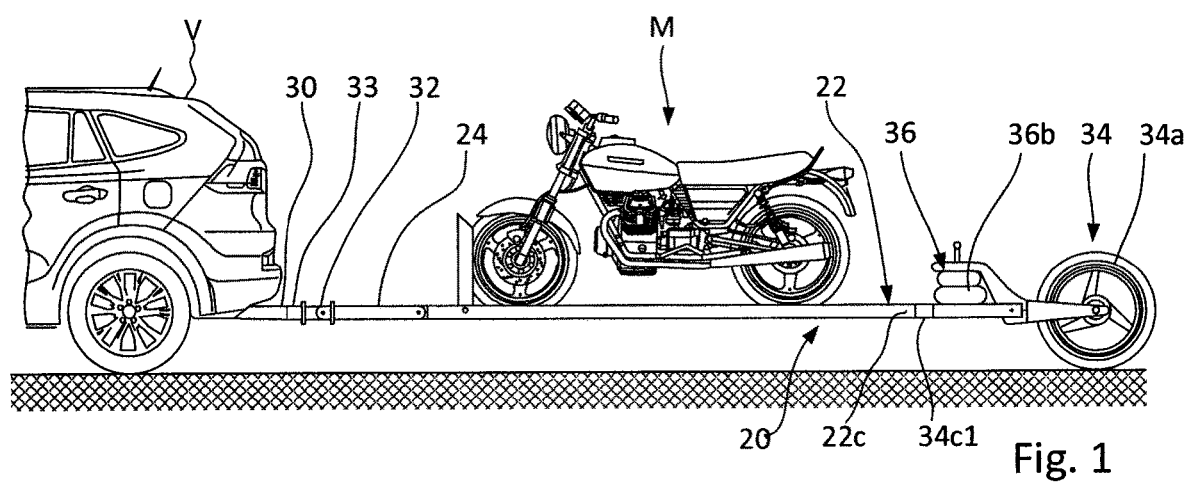
FIG. 1 is a side view of a single-wheel drop-floor trailer of the invention with a motorcycle on the platform of the trailer, the trailer platform being shown raised by trailer jacks to a position ready for connection to the hitch of a vehicle and to a trailer wheel.
Figure 2:
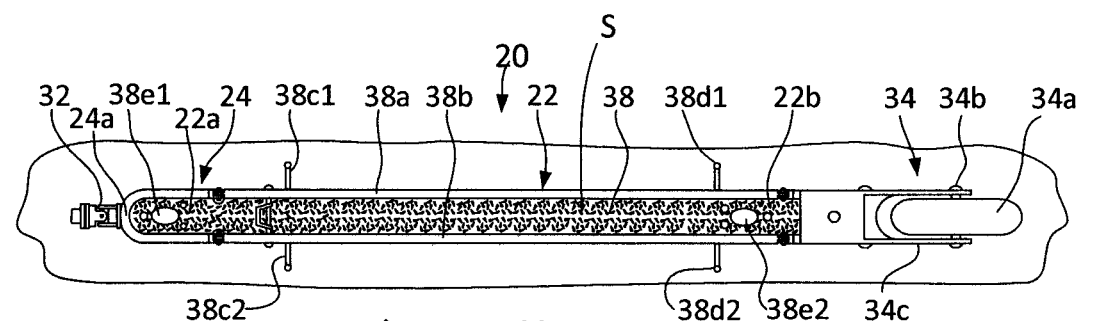
FIG. 2 is a top view of the trailer of FIG. 1 without the load but with the wheel connected to the rear end of the main tow bar frame of the trailer.
Figure 3:
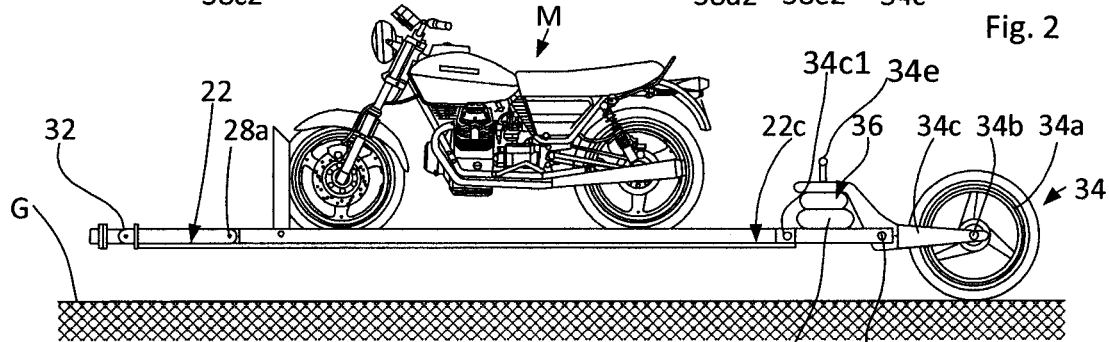
FIG. 3 is a side view of the trailer of the invention with the trailer wheel connected to the rear end of the main tow bar frame of the trailer, the towing vehicle being not shown.
Figure 4:
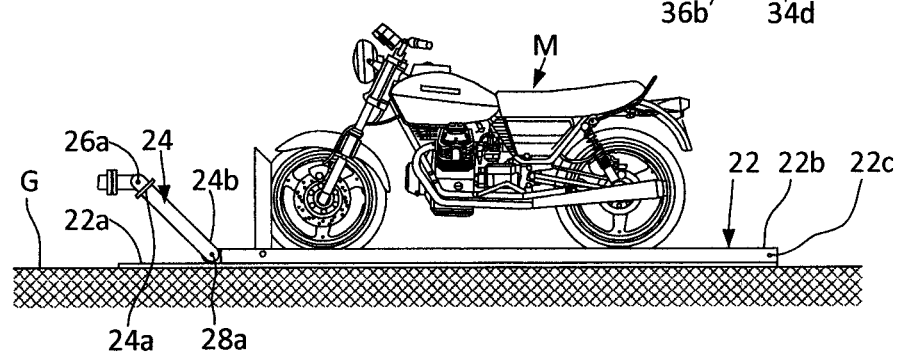
FIG. 4 is a side view of the trailer of the invention in the ground-level position with the motorcycle loaded and the trailer wheel disconnected, the towing vehicle being not shown.
Figure 5:
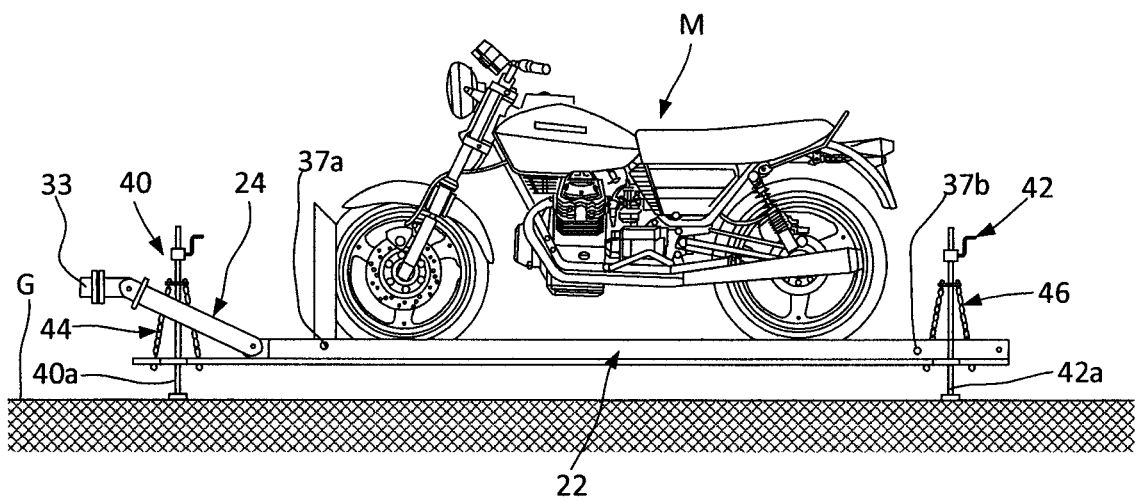
FIG. 5 is a side view of the trailer of the invention with the main tow bar frame of the trailer shown in an intermediate position during raising or descending of the frame by means of the trailer jacks, the tow vehicle being not shown.
Figure 7:
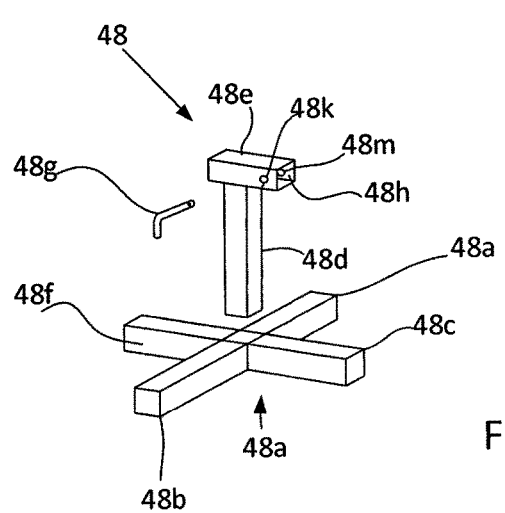
FIG. 7 is a three-dimensional view of the trailer ground support for supporting the trailer in the raised position when the trailer is disconnected from the tow vehicle and need to be supported in a raised position for convenience of cleaning and repair.
Figure 6:
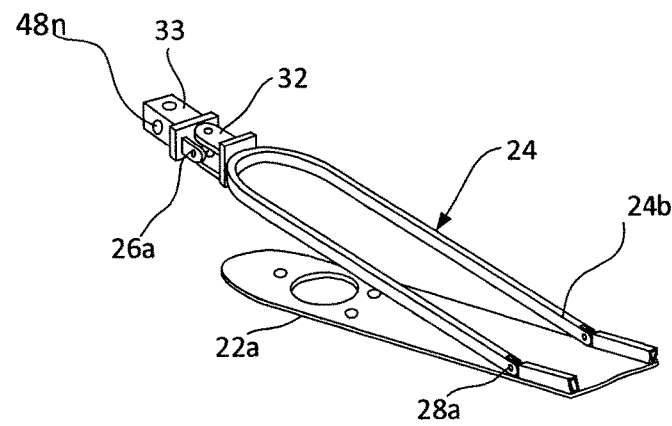
FIG. 6 is a three-dimensional view of a two-pivot link that connects the vehicle hitch to the main tow bar frame and is made in the form of a U-shaped yoke, which embraces the front end of the trailer frame.
Figure 8:
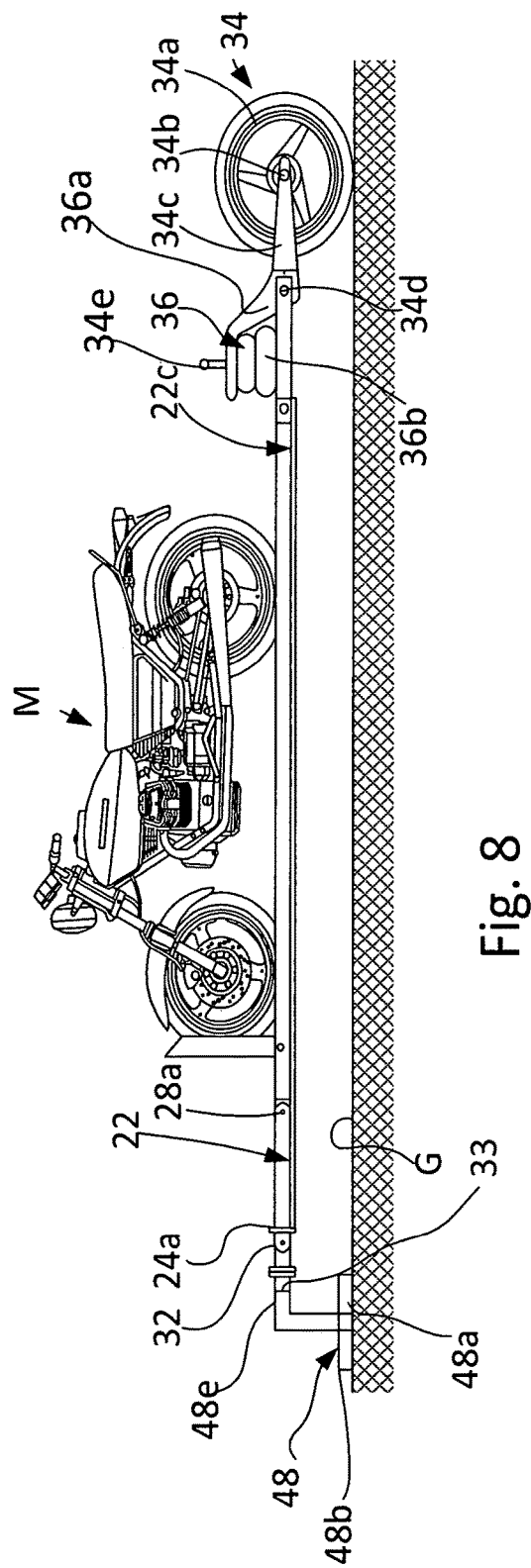
FIG. 8 is a side view of the trailer of the invention in a position supported by the ground support for storage, cleaning, or repair.
Figure 9:
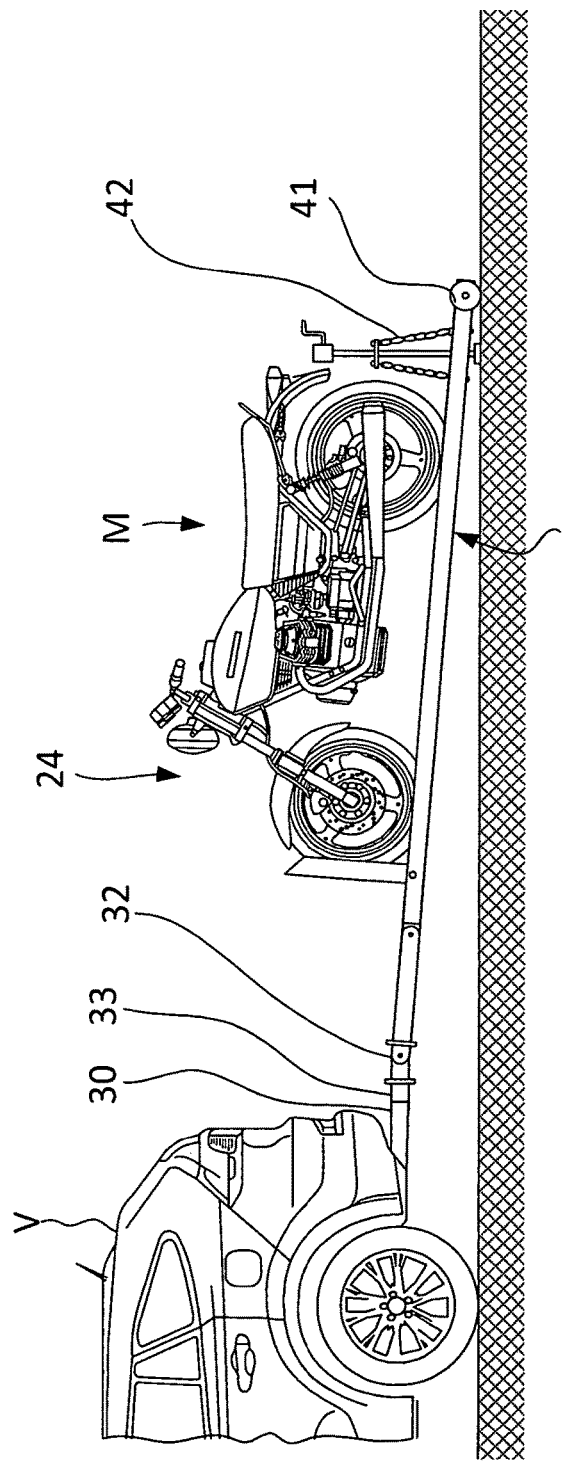
FIG. 9 is a side view similar to FIG. 1 illustrating the trailer of the invention in a position for loading/unloading a motorcycle onto the trailer platform by using only one trailer jack.

The trailer of the invention will further be described in more detail with reference to the accompanying drawings, wherein FIG. 1 is a side view of a single-wheel drop-floor trailer of the invention with a motorcycle on the platform of the trailer, the trailer platform being shown raised by trailer jacks to a position ready for connection to the hitch of a vehicle and to a trailer wheel. FIG. 2 is a top view of the trailer of FIG. 1 without the load but with the wheel connected to the rear end of the main tow bar frame of the trailer. FIG. 3 is a side view of the trailer of the invention with the trailer wheel connected to the rear end of the main tow bar frame of the trailer, the towing vehicle being not shown. FIG. 4 is a side view of the trailer of the invention in the ground-level position with the motorcycle loaded and the trailer wheel disconnected, the towing vehicle being not shown. FIG. 5 is a side view of the trailer of the invention with the main tow bar frame of the trailer shown in an intermediate position during raising or descending of the frame by means of the trailer jacks, the tow vehicle being not shown. FIG. 6 is a three-dimensional view of a two-pivot link that connects the vehicle hitch with the main tow bar frame and is made in the form of a U-shaped yoke, which embraces the front end of the trailer frame. FIG. 7 is a three-dimensional view of the trailer ground support for supporting the trailer in the raised position when the trailer is disconnected from the tow vehicle and need to be supported in a raised position for convenience of cleaning and repair. FIG. 8 is a side view of the trailer of the invention in a position supported by the ground support for storage, cleaning, or repair. FIG. 9 is a side view similar to FIG. 1 illustrating the trailer of the invention in a position for loading/unloading a motorcycle onto the trailer platform by using only one trailer jack.

As shown in the drawings, the trailer of the invention, which in general is designated by reference numeral 20 (FIGS. 1 and 2), contains a main tow bar frame 22 having a front end 22a, a rear end 22b, and a rear hitch 22c at the rear end 22b of the main tow bar frame 22 (FIGS. 2 and 4).

An essential component of the trailer of the invention is a two-pivot link 24 (FIGS. 1, 2, and 6) having a link front end 24a and link rear end 24b with a first link pivot 26a on the link front end 24a and a second link pivot 28a on the link rear end 24b (FIGS. 4 and 6). In fact, the first link pivot 26a is a pivot of the universal joint 32, which allows the two-pivot link 24 to turn in a vertical plane (FIG. 6).

The link rear end 24b of the link 24 is pivotally connected to the front end 22a of the main tow bar frame 22 via the second link pivot 28a with possibility of turning in a vertical plane, and the front end of the link 24 is connected at 26a to a universal joint 32. The front end of the universal joint 32 is made as a trailer hitch member 33 connectable to the hitch 30 of a tow vehicle V (FIGS. 1, 2, and 6). Connection of the main tool bar frame 22 of the trailer via the universal joint 32 allows the frame to perform motions in vertical and horizontal planes relative to the towing vehicle V. In other words, the universal joint 32 compensates the trailer 20 for movements in a vertical direction when the trailer moves on unevenness of the road and for turning of the trailer 20 relative to the tow vehicle V on curved turns of the road.

As can be seen from FIG. 6, the two-pivot link 24 is made as a U-shaped yoke, which embraces the front end 22a of the main tow bar frame from both sides.

The two-pivot link 24 has a length sufficient for lowering the main tow bar frame 22 to the ground G by turning the two-pivot link in a clockwise direction around the first link pivot 26a when, as described later in connection with the trailer operation, the main tow bar frame 22 is lowered to the ground level for loading a motorcycle L to be transported (FIG. 4).

In the drawings, a load L to be transported by the trailer 20 of the invention is shown as a motorcycle. It is understood, however, that the motorcycle is shown only as an example and another two-wheel vehicle such as a bicycle, scooter, or the like may be an object for transportation with the trailer of the invention.

As can be seen from FIGS. 1, 2, and 3, the trailer 20 of the invention is provided with a single wheel assembly 34. The single wheel assembly 34 consists of a single wheel 34a with an axle 34b (FIGS. 2, 3, and 7), on which the single wheel 34a rotates. The assembly 34 also includes a U-shaped arm 34c that embraces the wheel and has its front end 34c1 connectable to the rear hitch 22c (FIGS. 1 and 3) on the rear end 22b of the main tow bar frame 22. The rear end of the U-shaped arm 34c is rotationally connected to the axle 34b, so that the U-shaped arm 34c can turn around a pivot axle 34d (FIG. 3) in a vertical plane. Reference numeral 34e designates a handle installed on the 34c for convenience of guiding of the wheel 34a from the storage to the trailer or vice versa.

The assembly 34 further contains a wheel shock absorber 36 (FIGS. 1 and 3) with an absorber arm 36a having one end rotationally installed on the axle 34b and another end biased to a resilient shock absorber 36b, which may be made, e.g., in the form of an inflatable body.

The main tow bar frame 22 includes a flat platform 38 (FIG. 2) comprised of a metal plate with a roughened load-supporting surface S (see FIG. 2). Attached, e.g., welded, to the sides of the plate are lateral members 38a and 38b (FIG. 2) formed by tubular elements having a rectangular, e.g., a square cross section.

A load, e.g., the motorcycle L, can be secured to the flat platform 38 of the main tow bar frame 22 by conventional means (not shown), e.g., by straps attached to the lateral extensions 38c1, 38c2, 38d1, and 38d2 that protrude sidewise from the main tow bar frame (FIG. 2). The lateral extensions 38c1, 38c2, 38d1, and 38d2 may be comprised of elongated bodies, e.g., bars or tubes insertable through aligned openings formed in the lateral members 37a and 37b (although four such openings is made in the frame only two openings 37a, 37b are shown and seen in FIG. 5).

The motorcycle securing means are beyond the scope of the invention and may be embodied as shown, e.g., in U.S. Pat. No. 9,539,951 issued to Dan Levi on Jan. 10, 2017.

As can be seen from FIG. 2, the main tow bar frame 22 has two through holes formed in the flat platform 38. A hole 38e1 is formed at the front end 22a of the frame 22, and a hole 38e2 is formed at the rear end 22b of the frame 22. These holes are intended for passing insertable portions 40a and 42a of two respective removable trailer jacks 40 and 42 (FIG. 5) normally used for raising and lowering the floor of the trailer, in this case, the main tow bar frame 22 of the trailer 20 which can be lowered to the ground lever for loading the motorcycle L onto the platform 38 and then raised with the load to the level at which the trailer 20 can be hitched to the vehicle V (FIG. 1). The trailer jacks 40 and 42 suitable for used in conjunction with the trailer 20 of the present invention are commercially available products, e.g., such as Fulton Sidewind 14 Travel A-Frame Jack 5000-Pound available at TowUniverse.com, PA, USA.

According to another aspect of the invention, if the load is not too heavy, e.g., if the load is a bicycle or a light motorcycle, only one jack can be used for loading and unloading the bicycle or the motorcycle. In this case, as shown in FIG. 9, only the trailer jack 42 may be installed at the rear end of the main tow bar frame 22. A loading/unloading operation with the use of only one jack will be described later in the consideration of the trailer use.

The removable trailer jacks 40 and 42 can be attached to the platform 38 by an attachment device such as at least couples of chains 44 and 46. One end of each chain is attached to the flat platform 38 and another is hooked to the respective removable trailer jack.

The diameters or dimensions of the holes 38e1 and 38e2 (FIG. 2) are greater than the cross section of the insertable portion 40a and 42a of the jacks 40 and 42 (FIG. 5). This is needed to provide the removable trailer jacks 40 and 42 with some freedom of motion in a position secured by the chains 44 and 46 for compensating displacements of the main tow bar frame 22 with the attached single wheel assembly 34 in the horizontal direction during turning of the two-pivot link 24 in the clockwise direction for descending the main tow bar frame 22 to the ground G.

If necessary, the trailer 20 of the invention may be provided with an L-shaped ground support 48 of the type shown in FIG. 7. The ground support 48 has a base 48a, which for stability may have a cross-like shape with arms 48a, 48b, 48c, and 48f. Rigidly installed on the base 48a is a vertical stand 48d with an arm 48e arranged parallel to the base and intended for supporting the trailer hitch 33, which in this case is inserted into the opening 48h at the end face of the arm 48e having a cross-section mating the trailer hitch 33. FIG. 8 is a side view of the trailer 20 of the invention in a position supported by the ground support 48. In the position hitched to the support 48, the trailer 20 is locked by a pin 48g insertable through holes 48k, 48m of the support 48 and through the hole 48n provided on the trailer hitch 33 (FIGS. 6 and 7). In a raised position without a load but with the support 48 at front and the wheel assembly 34 behind the frame 22, the trailer may be conveniently cleaned or repaired.

The trailer 20 of the invention is used as described below.

Let us consider a case when a load, e.g., the motorcycle M, is to be towed from one place to another destination. Assume that the trailer 20 of the invention is stored in a disassembled state (i.e., with the wheel assembly 34 disconnected from the main tow bar frame 22) on the floor of the storage.

First, the main tow bar frame 22 is placed into an area convenient for loading. The motorcycle M is guided onto the platform 38 and secured on the platform with the known securing means, e.g., straps (not shown) tied up to the lateral extensions 38c1, 38c2, 38d1, and 38d2 that protrude sidewise from the main tow bar frame (FIG. 2). Let us consider the use of two jacks. Thus, the removable trailer jacks 40 and 42 are installed on and secured to the platform 38 by the chains 44 and 46 with the insertable portions 40a and 42a passing through the holes 38e1 and 38e2 to the ground. The jacks are activated and begin to raise the platform 38 in a plane-parallel motion.

The raising operation is stopped when the platform 38 reaches a level at which the front hitch 33 of the frame 38 can be connected to the vehicle hitch 30 and the rear hitch 22c of the frame 38 can be connected to the U-shaped arm 34c of the wheel assembly 34. Next, the wheel assembly is connected to the rear end of the trailer 20, and the front end of the trailer 20 is connected to the vehicle V. The jacks may remain in place secured to the platform 38 or can be disconnected from the trailer. Now, the motorcycle M is ready for towing.

When, upon arrival to the destination, the motorcycle M needs to be unloaded, the jacks are reinstalled and activated or simply activated if remains on the platform. The insertable portions 40a are lowered to the ground and fixed in this position in the jacks. The wheel assembly 34 is disconnected (FIG. 5) but the front end of the main tow bar frame 22 remains hitched to the vehicle V. Next, the jacks are activated for lowering the main tow bar frame 22 in a plane-parallel motion, which becomes possible due to the provision of the two-pivot link 24. The axial displacements of the frame 22, which occurs during turning of the two-pivot link 24 in the clockwise direction are compensated by slight motions of the insertable portions of the jacks in the holes 38e1 and 38e2 which have dimensions larger than the diameters of the insertable portions.

When the platform 38 lays on the ground, the motorcycle is untied and can be removed from the platform 38. The main tow bar frame 22 can be unhitched from the vehicle, the jacks are disconnected, and all the parts can be stored in a proper location. Since the two-pivot link 24 has a U-shaped configuration which overlaps a part of the length of the main tow bar frame 22, the overall length of the frame 22 is shortened so that in a flat state the frame may be stored in a garage under the vehicle.

According to another aspect of the invention, when the load is relatively light, e.g., a bicycle or a light motorcycle, loading/unloading operations can be accomplished with the use of only one jack, such as the jack 42 shown in FIG. 9. In this case, the motorcycle M may be guided to the trailer main tow bar frame 22 and secured thereon while the frame lays on the garage floor. The link 24 is raised and the trailer hitch 33 is secured to the hitch of the vehicle V. Next the jack 42 is activated and used until the rear end 22b of the trailer platform 38 makes it possible to align the rear hitch 22c of the frame 22 with the front end 34c1 of the arm 34c for connection of the wheel assembly 34 to the frame 22. Alternatively, the motorcycle can be loaded and secured on the platform 38 after hitching to the vehicle, while the platform 38 is still lays on the ground.

For convenience of pulling the trailer over the garage floor, the rear end of the frame 22 may be provided with one or two small-diameter casters 41 (FIG. 9).

Although the invention has been described and illustrated with reference to specific examples of the single-wheel drop-floor trailer, it is understood that the invention is not limited by the illustrated examples and that any changes and modifications which do not depart from the scope of the attached patent claims are possible. For example, the trailer main tow bar frame different from one shown in the drawings. The load may be a suitcase, a rack for transporting glass windows, etc. The shock absorber may be a helical spring. Trailer jacks of type other than one exemplified in the specification may be used for raising and descending the trail frame, and any other modifications are possible, provided that the principle of plane-parallel motions of the drop floor based on the use of a two-pivot link as described above is maintained.

The invention claimed is:

1. A single-wheel drop-floor trailer for towing a load installed on the trailer, the towing being carried out by a vehicle having a vehicle hitch, the single-wheel drop-floor trailer comprising:
   a main tow bar frame having a front end, a rear end, and a rear hitch at the rear end;
   a two-pivot link having a link front end and link rear end with a first link pivot on the link front end and a second link pivot on the link rear end, wherein the link rear end is pivotally connected to the front end of the main tow bar frame with possibility of turning in a vertical plane;
   a trailer hitch for connecting the single-wheel drop-floor trailer to the vehicle hitch, the trailer hitch being rigidly connected to a part of a universal joint which allows the two-pivot link to turn in vertical and horizontal planes;
   a single wheel assembly comprising a single wheel with an axle on which the single wheel rotates, a U-shaped arm having an arm front end connected to the rear hitch and an arm rear end rotationally connected to the axle, a wheel shock absorber arm having a first end rotationally installed on the axle and a second end, and a shock absorber placed between the second end of the wheel shock absorber arm and the U-shaped arm;
   the two-pivot link having a length sufficient for lowering the main tow bar frame to the ground by turning the two-pivot link in a clockwise direction around the first link pivot.

2. The single-wheel drop-floor trailer according to claim 1, wherein the main tow bar frame has a first through hole near the front end and a second through hole near the rear end and wherein the single wheel drop-floor trailer is further provided with a first removable trailer jack insertable through the first through hole and a second removable trailer jack insertable through the second through hole.

3. The single-wheel drop-floor trailer according to claim 2, wherein the shock absorber comprises a resilient body.

4. The single-wheel drop-floor trailer according to claim 3, wherein the main tow bar frame comprises a flat platform comprising a plate having a load-supporting surface and lateral members formed by tubular elements, each having a square cross section, rigidly attached to the flat platform.

5. The single-wheel drop-floor trailer according to claim 4, further provided with devices for securing the first removable trailer jack and the second removable trailer jack to the flat platform of the main tow bar frame.

6. The single-wheel drop-floor trailer according to claim 5, wherein each of said devices for securing the first removable trailer jack and the second removable trailer jack comprises at least a couple of chains having one ends attached to the flat platform and other ends attached to the first removable trailer jack and the second removable trailer jack, respectively.

7. The single-wheel drop-floor trailer according to claim 6, wherein the load-supporting surface of the flat platform is roughened for improving friction engagement of the load with the load-supporting surface.

8. The single-wheel drop-floor trailer according to claim 4, wherein the first removable trailer jack and the second removable trailer jack each has an insertable portion, which is insertable through said first through hole and second through hole, respectively, to the ground, said portion having a cross section each of said first through hole and second through hole having a diameter greater than the cross section of the insertable portion to provide each of said first removable trailer jack and the second removable trailer jack with some freedom of motion in a position secured by the chains for compensating displacements of the main tow bar frame with the attached single wheel assembly in the horizontal direction during turning of the two-pivot link in the clockwise direction for descending the the main tow bar frame to the ground.

9. The single-wheel drop-floor trailer according to claim 1, wherein the two-pivot link is a U-shaped yoke which embraces the front end of the main tow bar frame inserted thereinto.

10. The single-wheel drop-floor trailer according claim 9, wherein the load installed on a vehicle is a two-wheeled vehicle.

11. The single-wheel drop-floor trailer according claim 10, wherein a two-wheeled vehicle is a bicycle.

12. The single-wheel drop-floor trailer according to claim 11, wherein the main tow bar frame has a first through hole near the front end and a second through hole near the rear end and wherein the single-wheel drop-floor trailer is further provided with a first removable trailer jack insertable through the first hole and a second removable trailer jack insertable through the second hole.

13. The single-wheel drop-floor trailer according to claim 12, wherein the shock absorber comprises a resilient inflatable body.

14. The single-wheel drop-floor trailer according to claim 13, wherein the main tow bar frame comprises a flat platform comprising a plate having a load-supporting surface and lateral members formed by tubular elements having square cross sections rigidly attached to the flat platform, the load-supporting surface being roughened.

15. The single-wheel drop-floor trailer according to claim 14, further provided with devices for securing the first removable trailer jack and the second removable trailer jack to the flat platform of the main tow bar frame.

16. The single-wheel drop-floor trailer according to claim 6, further provided with a ground support having a member engageable with the trailer hitch for supporting the front end of the main tow bar frame when the trailer jacks are removed from the main tow bar frame, and when the trailer is connected to the single wheel assembly but is disconnected from the vehicle.

17. The single-wheel drop-floor trailer according to claim 1, wherein the main tow bar frame has at least one through hole and wherein single-wheel drop-floor trailer is further provided with at least one removable trailer jack having an insertable portion insertable through the at least one through hole, the main tow bar frame having a device for securing the at least one removable jack on the trailer in a secured position.

18. The single-wheel drop-floor trailer according to claim 17, wherein the two-pivot link is a U-shaped yoke which embraces the front end of the main tow bar frame inserted thereinto.

19. The single-wheel drop-floor trailer according to claim 18, wherein said at least one through hole has a diameter, said insertable portion having a cross section smaller than the diameter of the at least one through hole to provide the removable trailer jack with some freedom of motion in the secured position for compensating displacements of the main tow bar frame with the attached single wheel assembly in the horizontal direction during turning of the two-pivot link in the clockwise direction for descending the main the tow bar frame to the ground, the single-wheel drop-floor trailer being further provided with at least one caster at the rear end the main tow bar frame.

20. The single-wheel drop-floor trailer according to claim 18, further provided with a ground support having a member engageable with the trailer hitch for supporting the front end of the main tow bar frame when the at least one removable trailer jack is removed from the main tow bar frame, and when the trailer is connected to the single wheel assembly but is disconnected from the vehicle.

* * * * *